(12) United States Patent
Mizrahi et al.

(10) Patent No.: US 11,374,865 B2
(45) Date of Patent: Jun. 28, 2022

(54) GROUP SPECIFIC LOAD BALANCING IN NETWORK DEVICES

(71) Applicant: Marvell Israel (M.I.S.L) Ltd., Yokneam (IL)

(72) Inventors: Tal Mizrahi, Haifa (IL); David Melman, Tel Aviv (IL); Adar Peery, Aseret (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 211 days.

(21) Appl. No.: 16/403,221

(22) Filed: May 3, 2019

(65) Prior Publication Data

US 2020/0007448 A1 Jan. 2, 2020

Related U.S. Application Data

(60) Provisional application No. 62/693,144, filed on Jul. 2, 2018.

(51) Int. Cl.
*H04L 12/803* (2013.01)
*H04L 29/06* (2006.01)
*H04L 47/125* (2022.01)
*H04L 69/22* (2022.01)

(52) U.S. Cl.
CPC ........... *H04L 47/125* (2013.01); *H04L 69/22* (2013.01)

(58) Field of Classification Search
CPC .... H04L 47/125; H04L 67/1023; H04L 69/22
See application file for complete search history.

(56) References Cited

U.S. PATENT DOCUMENTS

| | | | |
|---|---|---|---|
| 7,898,959 B1* | 3/2011 | Arad | H04L 45/24 |
| | | | 370/235 |
| 9,237,100 B1* | 1/2016 | Mizrahi | H04L 45/245 |
| 9,455,918 B1 | 9/2016 | Revah et al. | |
| 9,503,435 B2 | 11/2016 | Roitshtein et al. | |
| 9,876,719 B2 | 1/2018 | Revah et al. | |
| 9,906,592 B1 | 2/2018 | Roitshtein et al. | |
| 10,244,047 B1* | 3/2019 | Mizrahi | H04L 45/245 |
| 2014/0115167 A1* | 4/2014 | Roitshtein | H04L 47/70 |
| | | | 709/226 |

(Continued)

OTHER PUBLICATIONS

U.S. Appl. No. 15/423,389, Kampeas et al., "Distributed Dynamic Load Balancing in Network Systems," filed Feb. 2, 2017.

*Primary Examiner* — Mehmood B. Khan

(57) ABSTRACT

A general load balancing value for a packet received by a network device is generated based at least in part on information in a header of the packet. The packet is directed to a network interface group comprising a set of network interfaces via which the packet can be transmitted towards a destination of the packet. A group-specific load balancing value for the packet is then determined based on group-specific load balancing configuration corresponding to the network interface group and is used to select a network interface, from among the set of network interfaces, and the packet is transmitted towards the destination of the packet via the selected network interface. The group-specific load balancing configuration corresponding to the network interface group is subsequently reconfigured to redistribute selection of network interfaces, among the set of network interfaces, for transmission of packets subsequently directed to the network interface group.

20 Claims, 6 Drawing Sheets

(56) References Cited

U.S. PATENT DOCUMENTS

| | | | |
|---|---|---|---|
| 2017/0019369 A1* | 1/2017 | Ravinoothala | H04L 45/245 |
| 2017/0264550 A1* | 9/2017 | Larose | H04L 67/1029 |
| 2017/0302577 A1* | 10/2017 | Worth | H04L 45/7453 |
| 2018/0176134 A1* | 6/2018 | Pignataro | H04L 67/10 |
| 2019/0182202 A1* | 6/2019 | Garcia Del Rio | H04L 45/28 |
| 2020/0099620 A1* | 3/2020 | Shen | H04L 47/125 |

* cited by examiner

GROUP SPECIFIC LOAD BALANCING IN NETWORK DEVICES

CROSS REFERENCES TO RELATED APPLICATIONS

This application claims the benefit of U.S. Provisional Patent App. No. 62/693,144, entitled "Multi-Sub-Hash Computation for Load Balancing in Network Devices," filed on Jul. 2, 2018, the disclosure of which is hereby expressly incorporated herein by reference in its entirety.

FIELD OF TECHNOLOGY

The present disclosure relates generally to communication networks, and more particularly to load balancing in network devices.

BACKGROUND

In a typical communication network, a network device, such as a switch, receives and transmits packets via ports coupled to network links. In some situations, there are more than one possible network link via which a packet can be transmitted to properly forward the packet to its destination. For example, network links sometimes are purposefully aggregated to provide more bandwidth between communicating devices or networks. As another example, more than one path through a network may lead to a particular destination, presenting multiple equally attractive routing choices for routing of packets to the particular destination. Grouping network links together to define wider communication channels is known as link aggregation, and a group of aggregated ports is known as a Link Aggregation Group (LAG). In those situations where multiple network links present equally attractive routing choices to a network switch, the routing technique is typically referred to as equal-cost multi-path (ECMP) routing.

In situations in which multiple network links are available for forwarding packets, or packet flows, towards their destinations, network devices apply load balancing techniques to distribute transmission of the packets, or the packet flows, among the multiple network links. Some typical network devices apply a hash function to a packet flow key, which includes, for example, information characterizing a packet as belonging to a particular packet flow, such as a source port of the packet an internet protocol (IP) 5-tuple value from an IP header of the packet, etc., to calculate a hash value for the packet, and subsequently select a network link via which to transmit the packet based on the hash value calculated for the packet. To maintain packet order per packet flow, it is typically desirable that packets that belong to a same packet flow are routed to the destination of the packet flow via a same network link and, ultimately, via a same network path. In some situations, however, hash values calculated for packets belonging to different packet flows select a same network link in a group of links, resulting in multiple packet flows being transmitted via the same network link in the group of links while other network links in the group may be underutilized.

SUMMARY

In an embodiment, a method comprises: receiving a packet at a network device; generating, at the network device, a general load balancing value for the packet based at least in part on information in a header of the packet; directing, at the network device, the packet to a network interface group, the network interface group comprising a set of network interfaces via which the packet can be transmitted towards a destination of the packet; determining, at the network device based on group-specific load balancing configuration corresponding to the network interface group, a group-specific load balancing value for the packet; selecting, at the network device based on the group-specific load balancing value, a network interface, from among the set of network interfaces belonging to the network interface group, for transmission of the packet; transmitting the packet towards the destination of the packet via the network interface selected for transmission of the packet; and reconfiguring, at the network device, the group-specific load balancing configuration corresponding to the network interface group to redistribute selection of network interfaces, among the set of network interfaces belonging to the network interface group, for transmission of packets subsequently directed to the network interface group without redistributing selection of network interfaces among any other set of interfaces belonging to any other network interface group for transmission of packets subsequently directed to the other network interface group.

In another embodiment, a network device comprises: a plurality of network interfaces; a packet processor coupled to the plurality of network interfaces, the packet processor including: a general load balancing value generator configured to generate, based at least in part on information in a header of the packet, a general load balancing value for a packet received via a network interface of the plurality of network interfaces, a forwarding engine configured to direct the packet to a network interface group for transmission of the packet, the network interface group comprising a set of network interfaces, of the plurality of network interfaces, via which the packet can be transmitted towards a destination of the packets, a group-specific load balancing value engine configured to determine, based on group-specific load balancing configuration corresponding to the network interface group, a group-specific load balancing value for the packet, and an egress interface selection engine configured to select, based on the group-specific load balancing value, a network interface, from among the set of network interfaces, for transmission of the packet; and a load balancing configuration engine configured to reconfigure group-specific load balancing configuration corresponding to the network interface group to redistribute selection of network interfaces for transmission of packets subsequently directed to the network interface group among the set of network interfaces belonging to the network interface group.

DETAILED DESCRIPTION

Figure 1:
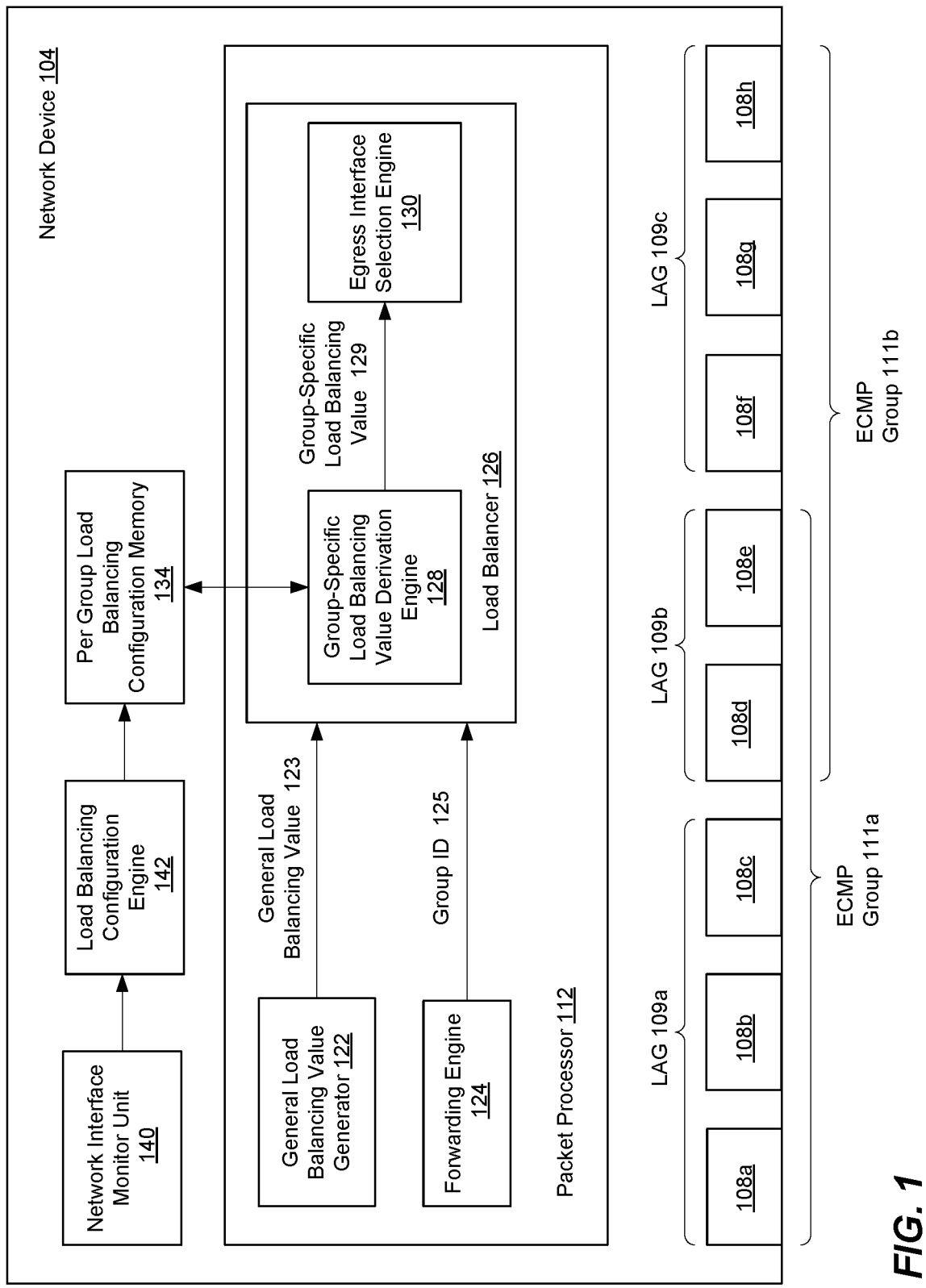
FIG. 1 is a block diagram of an example network device that is configured to implement configurable group-specific load balancing, according to an embodiment.

In embodiments described blow, a network device utilizes per-group configurable mode which determines a load balancing value used to select particular network links (or network interfaces coupled to the particular network links) within groups of network links (or network interfaces) available for routing packets towards their destinations. In an embodiment, the configurable selection is based on a general load balancing value, such as a general hash value, that is generated for a packet before a determination is made in regard to a particular network interfaces group for transmission of the packet. Subsequently, when the packet is forwarded to the particular network interface group determined for transmission of the packet, the network device determines a group-specific load balancing value for the packet based on specific configuration for the particular network interface group. For example, the network device selects a configurable subset of bits of a general load balancing hash value to derive, from the general load balancing value generated for the packet, a group-specific load balancing sub-hash value for the particular network interface group. As another example, the network device replaces the general load balancing value generated for the packet with other information associated with the packet, such as an identifier of a source port at which the packet was received by the network device. As yet another example, the network device replaces the general load balancing value generated for the packet with a pseudorandom number generated for the packet. The network device then selects a network interface, from among the network interfaces that are members of the particular network interface group, based on the group-specific load balancing value determined for the packet. The network device then transmits the packet via the selected network interface, in an embodiment.

Using configurable per-group selection allows the network device to independently control load balancing values for selection of network interfaces within different groups, in an embodiment. Thus, for example, when load balancing values used for network interface selection for packets belonging to multiple different packet flows result in selection of a same network interface within a particular group for transmission of the multiple different packet flows, the network device reconfigures the load balancing value utilized for network interface selection within the particular group, to rebalance packet flows among the network interfaces within the particular group, without affecting load balancing within other groups. Reconfiguring load balancing in a group to redistribute transmission of packet flows among ports 108 that are members of the group is particularly beneficial when the packet flows are long-lived packet flows, such as "elephant" packet flows being routed through the network device, in at least some embodiments.

Configuring different network interface groups to utilize different derivatives of a general load balancing value generated for packets allows the network device to generate the general load balancing value for a packet prior to determining the particular network interface group for transmission of the packet, and also allows the network device to control load balancing selection within the different network interface groups without independently generating separate load balancing values for the different groups. Thus, for example, the network device in an embodiment utilizes a single hash function for load balancing within the different network interface groups, instead of using different hash functions for the different network interface groups, while still independently controlling load balancing values for selection of network interfaces within the different groups. Implementing a single hash function for load balancing in different network interface groups of the network device is less computationally intensive and more efficient in terms of use of hardware, use of chip space, power consumption, etc., as compared to implementing respective different hash functions to for load balancing in different network interface groups, in at least some embodiments. Moreover, in an embodiment, the group-specific load balancing value derived from the general load balancing value for particular groups is uncorrelated with group-specific load balancing value derived from the general load balancing value for other groups. For example, group-specific hash values, derived from the general load balancing hash values, for particular groups is uncorrelated with group-specific load balancing values derived from the general load balancing hash value, for other groups. Uncorrelated group-specific load balancing values improve distribution of traffic among network interfaces in different groups, particularly in situations in which same network interfaces are members of multiple groups, such as a LAG group and an ECMP group.

FIG. 1 is a block diagram of an example network device 104 that is configured to implement configurable group-specific load balancing, according to an embodiment. The network device 104 includes a plurality of network interfaces (e.g., ports) 108 configured to couple to respective network links. In an embodiment, at least some of the ports 108, or network links coupled to the ports 108, are members of respective network link groups that include sets of network links via which received packets can be transmitted toward their destinations. For example, in an embodiment, respective sets of multiple ports 108, or network links coupled to the multiple ports 108, are members of link aggregation groups (LAGs) 109 that connect the network device 104 to respective external devices in the network. As an example, network links coupled to ports 108*a*, 108*b* and 108*c* are members of a first link aggregation group (LAG) 109*a* that connects the network device 104 to a first external device, network links coupled to ports 108*d* and 108*e* are members or a second LAG 109*b* that connects the network device 104 to a second external device, and network links coupled to ports 108*f*, 108*g* and 108*h* are members of a third LAG 109*c* that connects the network device 104 to a third external device, in an example embodiment. Additionally or alternatively, respective sets of multiple ports 108, or network links coupled to the multiple ports 108, are members of equal cost multiple path (ECMP) groups 111 that include network paths that are equally attractive for routing packets through the network to particular destinations, in an embodiment. As an example, network links coupled to ports 108*a*, 108*b*, 108*c*, 108*d* and 108*e* are members of a first ECMP group 111*a*, and network links coupled to ports 108*d*, 108*e* 108*f*, 108*g* and 108*h* are members of a second ECMP group 111*b*, in an example embodiment. In an embodiment, one or more network links coupled to respective one or more of the ports 108 are members of multiple network link groups, such as a LAG group and an ECMP group. As an example, a network link coupled to the port 108*d* is a member of the LAG 109*b* and the ECMP group 111*b*, in the illustrated embodiment. Similarly, a network link coupled to the port 108*e* is a member of the LAG 109*b* and the ECMP group 111*b*, in the illustrated embodiment.

The network device 104 includes a packet processor 112 coupled to the ports 108. The packet processor 112 is configured to process packets received via the ports 108, and to determine one or more other ports 108 via which packets are to be forwarded to one or more external devices. In some situations, the packet processor 112 determines a group of ports 108, such as a group of ports corresponding to a LAG or an ECMP group of network links, via which to transmit a packet, and the packet processor 112 applies load-balancing techniques to select a port 108, within the determined group of ports 108, via which to transmit the packet. To independently control load balancing selections for different groups of ports 108 using common general load balancing values generated for received packets, the packet processor 112 is configured to determine group-specific load balancing values for packets based on group specific configuration information, and to utilize the determined group-specific load balancing values to select particular ports, within the groups of ports, via which to transmit the packets. The packet processor 112 includes a general load balancing value generator 122 configured to generate a general balancing value 123 for a packet based on information included in one or more fields of a header of the packet and/or information otherwise associated with the packet. The general load balancing value 123 is for selection of a network interface 108, from among multiple network interfaces 108 that belong to a particular LAG group and/or a particular ECNIP group, via which the packet can be forwarded towards a destination of the packet, in an embodiment. In an embodiment, the general load balancing value generator 122 is configured to generate the general load balancing value 123 before a packet's destination is determined by the network device. For example, the general load balancing value generator 122 is configured to generate the general load balancing value 123 for the packet in conjunction with parsing out the packet header fields that are used for calculation of the general load balancing value 123 for the packet, in an embodiment.

In an embodiment, the general load balancing value generator 122 is configured to generate general load balancing values 123 for packets based on information that is shared among packets belonging to same packet flows. In this embodiment, the general load balancing value generator 122 generates a same general load balancing value 123 for packets that belong to a same packet flow. For example, a particular packet flow may be defined as packets with headers having a particular source address and a particular destination address, and the general load balancing value generator 122 is configured to generate the general load balancing value 123 for a packet based on (e.g., by applying a hash function to) a particular source address and a particular destination address associated with the packet, in an embodiment. In various embodiments, a packet flow may be defined as packets with headers having particular common information such as one or more of i) a particular source address, ii) a particular destination address, iii) a particular virtual local area network (VLAN) identifier (ID), iv) a particular priority, v) a particular packet type, etc. The general load balancing value generator 122 is configured to generate the general load balancing value 123 for the packet based on a hash key generated for the packet, wherein the hash key includes a set of values from a header of a packet or otherwise associated with the packet, including, for example, one or more of i) a particular source address, ii) a particular destination address, iii) a particular virtual local area network (VLAN) identifier (ID), iv) a particular priority, v) a particular packet type, vi) a particular multiprotocol label switching (MPLS) label, vii) a particular internet protocol (IP) 5-tuple value, etc. associated with the packet, in various embodiments. The hash key is user-configurable, in an embodiment. For example, which particular header fields and/or metadata information are included in the hash key depends on user configuration, in an embodiment. Generating general load balancing values for packets based on information that is shared among packets belonging to same packet flows ensures that packets that belong to a particular packet flow are forwarded towards a destination of the packet flow via a same port 108 and, ultimately, a same path through the network, in an embodiment.

In an embodiment, the general load balancing value generator 122 is a hash value generator configured to apply a hash function to one or more fields of a header of a packet and/or other information associated with the packet, such as metadata (e.g., an identifier of a source port, a time stamp, statistics, etc.) generated for the packet by the network device. Accordingly, general load balancing value generator 122 is sometimes referred to herein as a "general hash value generator 122" and the general load balancing value 123 is sometimes referred to herein as a "general hash value 123." In other embodiments, however, the general load balancing value generator 122 is configured to utilize other suitable techniques to generate the general load balancing value 123.

The packet processor 112 is configured to associate the general load balancing value 123, generated for a packet by the by general load balancing value generator 122, with the packet, in an embodiment. For example, the packet processor 112 is configured to store the general load balancing value 123, generated for a packet by the by general load balancing value generator 122, in a data structure, such as a packet descriptor, corresponding to the packet, in an embodiment.

The packet processor 112 also includes a forwarding engine 124. The forwarding engine 124 is configured to analyze header information in packets, or in the packet descriptors corresponding to the packets, to determine network interfaces 108 via which to transmit the packets. In situations in which multiple network links are available for transmission of a packet towards its destination, the forwarding engine 124 determines one or more groups of network interfaces 108 (e.g., network interfaces belonging to LAG and/or ECMP groups) for transmission of the packet. As merely an illustrative example, the forwarding engine 124 is configured to use a destination address in a header of a packet to perform a lookup in a forwarding database (not shown), which stores correspondences between destination addresses and network interface groups, to determine a particular network interface group via which the packet is to be transmitted. As another illustrative example, the forwarding engine 120 is configured to use a VLAN ID in a header of a packet to perform a lookup in a forwarding database (not shown) (e.g. the same forwarding database discussed above or a different forwarding database), which stores correspondences between VLAN IDs and network interface groups, to determine a particular network interface group for the packet. In an embodiment, the forwarding engine 124 is configured to determine group identifier (group ID) 125 associated with a particular network interface group via which a packet is to be transmitted. The forwarding engine 124 is configured store the group ID 125 in the packet descriptor corresponding to the packet, according to an embodiment.

The packet processor 112 also includes a load balancer 126 which, in turn, includes a group-specific load balancing value generator 128 and an egress interface selector 130. In some situations, when the general load balancing values 123 generated for packets provide sufficiently balanced distribution of packet among network interfaces in a network interface group determined for transmission of the packets, the load balancer 126 utilizes the general load balancing values 123 directly to select the particular network interfaces via which to transmit the packets, in an embodiment. In other situations, the load balancer 126 determines group-specific load-balancing values to independently control load balancing on network interfaces that belong to particular network interface groups, in an embodiment. The group-specific load balancing value generator 128 is configured to determine a group-specific load balancing value 129 for a packet. The group-specific load balancing value generator 128 is coupled to a per group load balancing configuration memory 134, and the group-specific load balancing value generator 128 is configured to generate the group-specific load balancing value 129 using configuration information in the per-group load balancing configuration memory 134, in an embodiment. The per-group load balancing configuration memory 134 includes respective configuration information for respective ones of a plurality of network link groups, according to an embodiment. The per-group load balancing configuration memory 134 includes associations between group IDs and indications of specific subsets of bits to be selected from a general load-balancing hash value to be used to derive group-specific load balancing hash values for the corresponding groups, in an embodiment. In some embodiments, per-group load balancing configuration memory 134 additionally or alternatively includes associations between the group IDs and other configuration information, such as respective offsets to be applied to the general load-balancing hash value and/or to a specified subset of bits selected from the general load balancing value, to scramble the load balancing value, for example by shifting the bits by the respective offset. As yet another example, the per-group load balancing configuration memory 134 includes associations between group IDs and group-specific configuration information that indicates that the general load balancing value is to be replaced with other information associated with the packet associated with the group ID, such as an identifier of a source port at which the packet was received by the network device, or with a random or pseudorandom number generated for the packet. In some cases, the per-group load balancing configuration memory 134 includes associations between group IDs and group-specific configuration information that indicates that the general load balancing value is to be used directly as the load balancing value for packets directed to the group, in an embodiment. The group-specific load balancing value generator 128 is configured to access the configuration memory 134 using the group ID 125 associated with a packet as an index into the configuration memory 134 and to retrieve, from the configuration memory 134, the configuration information for deriving a group-specific load balancing value from a general load balancing value associated with the packet, for group-specific network interface selection for transmission of the packet. Based on the configuration information retrieved from the configuration memory 134, the group-specific load balancing value generator 128 determines the group-specific load balancing value 129, in an embodiment.

Generally, the general load balancing value 123 generated for a packet is a load balancing value generated for the packet before a determination of network interface group is made for transmission of the packet, in an embodiment. Thus, for example, a common hash function is performed on hash keys generated for packets to generate the general load balancing values for the packets, without regard to specific network interface groups to which to forward the packets, in an embodiment. On the other hand, the group-specific load balancing value 129 is a load balancing value determined for the packet after the determination of network interface group is made for transmission of the packet, and based on specific configuration information for the specific network interface group determined for transmission of the packet, in an embodiment.

With continued reference to FIG. 1, the egress interface selector 130 is configured to select, based on the group-specific load balancing value generated for the packet, an egress interface 108, within a set of egress network interfaces 108 that are members of the corresponding group, in an embodiment. The network devices is configured to transmit the packet, towards the destination of the packet, via the selected egress network interface 108, in an embodiment.

Although the packet processor 112 is illustrated in FIG. 1 as including only a single load balancer 126, the packet processor 112 includes multiple load balancers 126 in other embodiments. The multiple load balancers 126 are configured to implement respective stages of load balancing, in some embodiments. For example, a first load balancer 126 implements load balancing to select a path in an ECMP group via which to transmit a packet and a second load balancer 126 then selects a port 108 coupled to a network link within a LAG group via which the packet can be transmitted on the selected path. In another embodiment, a single load balancer 126 implements multiple stages of load balancing. For example, a single load balancer 126 operates to both select a path in an ECMP group via which to transmit a packet and select a port 108 coupled to a network link within a LAG group via which the packet can be transmitted on the selected path. In yet another embodiment, the packet processor 112 implements only a single stage of load balancing, and a single load balancer 126 implements the single stage of load balancing, for example to select a path within an ECMP group via which to transmit a packet or to select a port 108 coupled to a network link within a LAG group via which to transmit the packet.

In an embodiment, the network device 104 also includes a network interface monitor unit 140 and a load balancing configuration engine 142. The network interface monitor unit 140 is configured to monitor traffic transmitted via respective ports 108 and/or respective network links coupled to the respective ports 108, and to detect unbalanced traffic on ports 108 that are members of a group (e.g., a LAG group, and ECMP group, etc.) of ports 108. In an embodiment, the network interface monitor unit 140 includes respective counters corresponding to respective ports 108, and the respective counters are configured to count a number of packets, a number of bytes, or another suitable measure of traffic transmitted via the corresponding ports 108 in a given amount of time. In an embodiment, the network interface monitor unit 140 is configured to detect an unbalanced distribution of traffic on ports 108 that are members of a group (e.g., a LAG group, and ECMP group, etc.) by determining that a particular member of the group is over-utilized or more heavily utilized relative to one or more other members of the group which are underutilized or less heavily utilized. For example, the network interface monitor unit 104 is configured to detect that i) a port 108 (e.g., the port 108*a*) in the LAG group 109*a* is overutilized, e.g., if the number of packet, the number of bytes, or the other measure of traffic transmitted on the port 108*a* exceeds a first threshold and that ii) one or more other ports 108 (e.g., the port 108*b* and the port 108*c*) that are members of the same group are underutilized, e.g., if the number of packets, the number of bytes, or the other measure of traffic transmitted via respective ones of the one or more other ports 108 is below a second threshold.

In response to detecting an unbalanced distribution among traffic ports 108 that are members of a group, the network interface monitor unit 140 triggers the load balancing configuration engine 142 to reconfigure load balancing selection for the corresponding group in which an unbalanced distribution among traffic ports 108 is detected. In an embodiment, the load balancing configuration engine 142 reconfigures load balancing selection for the corresponding group without reconfiguring load balancing selection for any other group. Thus, for example, reconfiguring load balancing to redistribute traffic among ports 108 belonging to a group in which an unbalanced distribution was detected does not affect load balancing distribution among any other group, in an embodiment. In an embodiment, the load balancing configuration engine 142 reconfigures load balancing selection for the corresponding group by updating configuration information stored in the entry of the per group load balancing memory 134 corresponding to the group. In an embodiment, the load balancing configuration engine 142 is configured to overwrite configuration information in the entry of the per group load balancing memory 134 with new configuration information that will cause the group-specific load balancing value generator 128 to begin generating a different group-specific load balancing value 129 for packets that are forwarded to the particular group. For example, the load balancing configuration engine 142 is configured to overwrite configuration information in the entry of the per group load balancing memory 134 with new configuration information that specifies a new subset of bits to be selected from the general load balancing value 123 for packets associated with the group ID corresponding to the particular group, and/or a new offset to be used to scramble the load balancing value generated for packets associated with the group ID corresponding to the particular group. Because the group-specific load balancing value generator 128 begins generating a different group-specific load balancing value 129, based on the updated configuration information, for packets that are subsequently forwarded to the particular group, traffic is redistributed among the ports 108 that are members of the group without changing traffic distribution among ports that are member of other groups, in an embodiment. For example, if the group-specific load balancing values 129 previously generated for packets belonging to different flows directed to the particular group (e.g., group 109a) resulted in selection of a same port 108 (e.g., port 108a) within the group for transmission of the different packet flows, the new group-specific load balancing values 129 generated for packets belonging to the packet flows results in selection of different ports 108 within the group for transmission of the different packet flows (e.g., selection of the port 108a for a first one of the packet flow, the port 108b for a second one of the packet flows, and the port 108c for a third one of the packet flows). Reconfiguring load balancing selection in a group to redistribute transmission of packet flows among ports 108 that are members of the group is particularly beneficial when the packet flows are long-lived packet flows, such as "elephant" packet flows being routed through the network device 104, in at least some embodiments, because the long-lived packet flows are sufficiently long in duration to ensure that, after being rebalanced, the more balanced transmission of the packet flows will persist in the network device.

Figure 2:
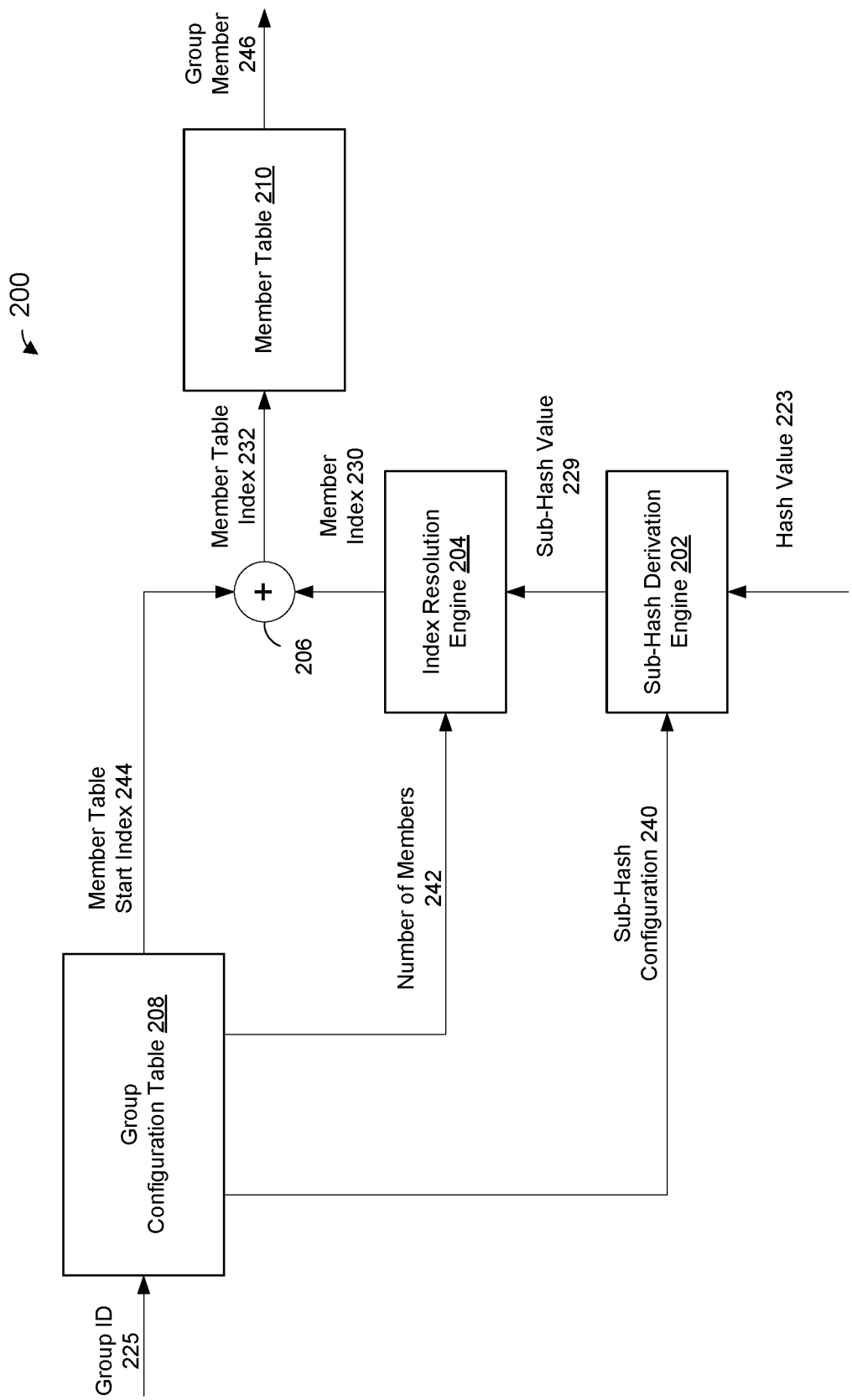
FIG. 2 is a block diagram of a load balancer utilized with the network device of FIG. 1, according to an embodiment.

FIG. 2 is a block diagram of a load balancer 200 configured to implement group-specific member selection, according to an embodiment. The load balancer 200 corresponds to the load balancer 126 of the network device 104 of FIG. 1, according to an embodiment, and FIG. 2 is described in the context of the network device 104 of FIG. 1 for example purposes. In other embodiments, however, the load balancer 200 is utilized with a suitable device different from the network device 104 of FIG. 1. Similarly, the load balancer 126 of the network device 104 of FIG. 1 is a suitable load balancer device different from the load balancer device 200, in some embodiments.

The load balancer 200 includes a sub-hash derivation engine 202, an index resolution engine 204 and a summation engine 206, in an embodiment. Additionally, the load balancer 200 includes or is coupled to a group configuration table 208 and a member table 210, in an embodiment. The sub-hash derivation engine 202 is configured to operate on a general hash value 223 associated with a packet, directed to a group (e.g., a LAG or an ECMP group) identified by a group ID 225 associated with the packet, to generate a group-specific sub-hash value 229 for the packet. The general hash value 223 corresponds to the general load balancing value 123 generated for the packet by the general load balancing value generator 122 in FIG. 1, the group ID 225 corresponds to the group ID 125 in FIG. 1, and the group-specific sub-hash value 229 corresponds to the group-specific load balancing value 129 in FIG. 1, in an embodiment. In an embodiment, the sub-hash derivation engine 202 is configured to select, from the general hash value 223, a subset of bits specified, in the group configuration table 208, for the corresponding group. In other embodiments, another suitable engine in place of the sub-hash derivation engine 202 to generate a suitable group-specific value 229 other than a sub-hash value for the packet. For example, an engine that replaces the general hash value 223 with an identifier of a source port associated with the packet is utilized. As another example, a random or pseudorandom number generator is utilized to generate a random or pseudorandom number for the packet to replace the general hash value general hash value 223, in another embodiment.

Figure 3:
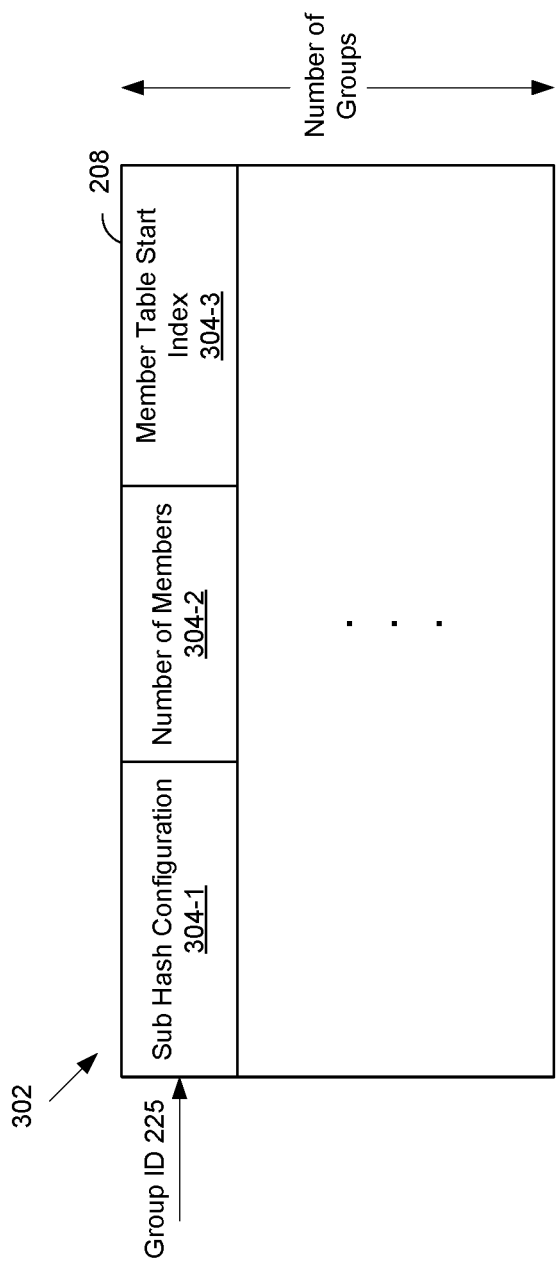
FIG. 3 is a block diagram of a group configuration table utilized with the load balancer of FIG. 2, according to an embodiment.

With continued reference to FIG. 2, in an embodiment, the configuration table 208 stores associations between group IDs and configuration information for member selection in the corresponding group. Referring briefly to FIG. 3, the group configuration table 208 includes a plurality of entries 302 indexed by respective group IDs, in an embodiment. Each entry 302 in the configuration table 208 corresponds to a particular row of the configuration table 208, in an embodiment. The number of entries in the configuration table 208 corresponds to the number of groups (e.g., LAG groups and/or ECMP groups) supported by the network device 104. Each entry 302 includes a sub-hash configuration field 304-1 that specifies a subset of bits to be selected from the general hash value 223 to generate the group-specific sub-hash value 229, in an embodiment. In some embodiments, the sub-hash configuration field 304-1 additionally includes an offset to be applied to the subset of bits selected from the general hash value 223, to scramble the subset of bits selected from the general hash value 223, for example by shifting the bits in the subset of bits by a particular group-specific offset. In an embodiment, the sub-hash configuration fields 304-1 in different entries 302, corresponding to different groups, specify different subsets of bits (bits at different bit indices) and/or different offsets to be used for generating group-specific sub-hash values for packets directed to the corresponding groups. Accordingly, group-specific sub-hash valued 229 generated for packets directed to different groups include different subsets of bits (bits at different bit indices) selected from the corresponding general hash values 223 and/or are scrambled using different offsets. In an embodiment, the sub-hash configuration fields 304-1 are configurable to specify particular subsets of bits (bits at different bit indices) and/or particular offsets to be used for deriving group-specific sub-hash valued 229 for the corresponding groups. Thus, for example, the network device 104 (e.g., the load balancing configuration engine 142 of the network device 104) is configured to reconfigure load balancing selection for a particular group by updating the sub-hash configuration field 304-1 in the entry 302 corresponding to the particular group to specify one or both i) a new subset of bits and ii) a new offset to be used for scrambling group-specific sub-hash valued 229 for subsequent packets directed to the particular group.

In some embodiments, each entry 302 additionally includes a number of members field 304-2 and a member table start index field 304-3. The number of members field 304-2 specifies a number of members included in the corresponding group. For example, in an embodiment, the number of members field 304-2 specifies a number of respective ports 108, or a number of network links coupled to respective ports 108, that are members of a LAG group associated with the group ID. As another example, in an embodiment, the number of members field 304-2 specifies a number of respective paths included in an ECMP group associated with the group ID. The member table start index field 304-3 specifies an index of an initial entry, in the member selection table 210, corresponding to the group associated with the group ID, according to an embodiment. In some implementations, the number of members fields 304-2 and/or the member table start index fields 304-3 are omitted from the entries 302 of the configuration table 208.

With reference to FIGS. 2 and 3, the load balancer 200 is configured to access an entry 302 in the configuration table 208 using the group ID 225 associated with the packet, and to retrieve from the entry 302 indexed by the group ID 225 configuration information for selection of a member within the corresponding group. In an embodiment, the load balancer 200 is configured to retrieve i) a sub-hash configuration indication 240 from the sub-hash configuration field 304-1 of the entry 302, ii) a number of members indication 242 from the number of members field 304-2 of the entry 302 and iii) a member table start index 244 from the member table start index field 304-3 of the entry 302. The sub-hash derivation engine 202 is configured to select, from the general hash value 223, the subset of bits specified by the sub-hash configuration information 240. In an embodiment, the sub-hash configuration information 240 includes a "First" bit indication that specifies an index of a first bit to be selected from the hash value 223 and a "Last" bit indication that specifies an index of a last bit to be selected from the hash value 223, and the sub-hash derivation engine 202 generates the sub-hash value 220 from the hash value 223 according to:

$$SubHash=Hash[Last:First] \quad (1)$$

In an embodiment, the configuration information 240 additionally includes an "Offset" indication that specifies an offset as an additional configurable factor for generating the group-specific sub-hash value 229. In this embodiment, the sub-hash derivation engine 202 generates the sub-hash value 220 from the hash value 223 according to:

$$SubHash=Hash[Last:First]+Offset \quad (2)$$

As an example, in an embodiment, the hash value 223 is a 32-bit hash value Hash[31:0], the "First" bit indication in the configuration information 240 is set to 15, the "Last" bit indication in the configuration information 240 is set to 0, and the "Offset" indication in the configuration information 240 is set to 0 or omitted, the group-specific sub-hash value 229 is SubHash[15:0] having the bits 15:0 selected from the hash value 223.

Figure 4:
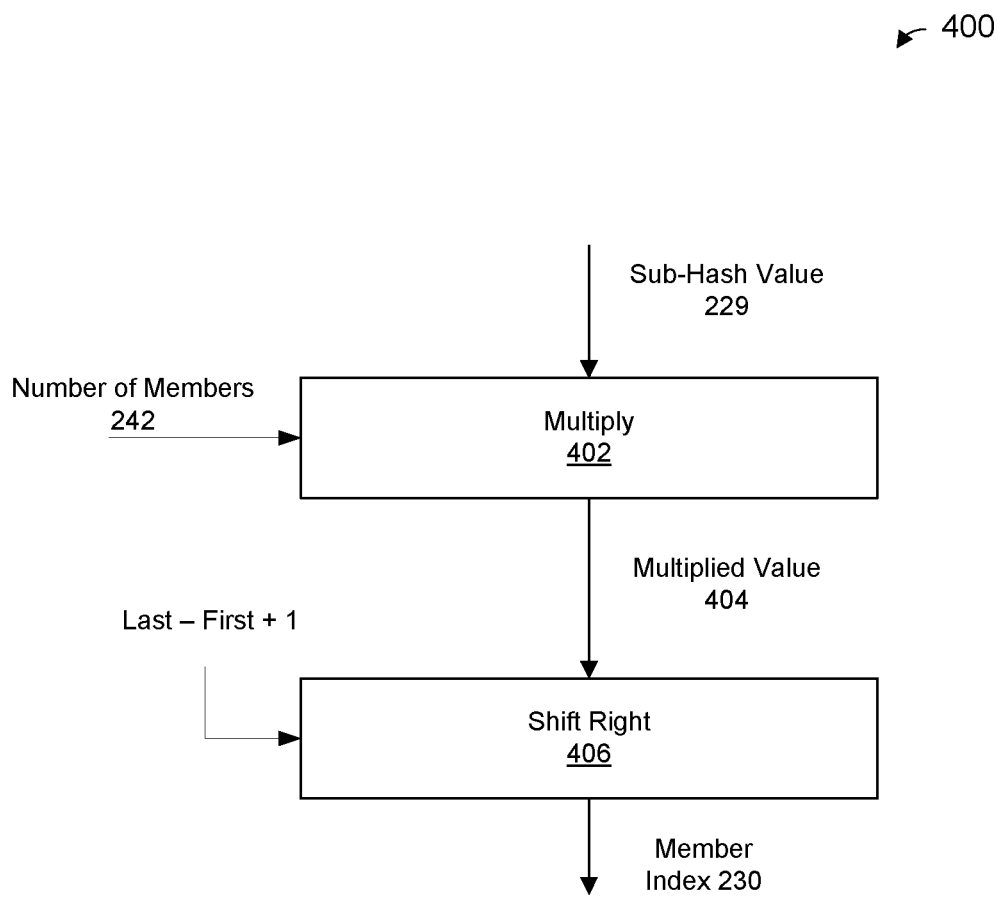
FIG. 4 is a block diagram of an index resolution engine utilized with the load balancer of FIG. 2, according to an embodiment

The index resolution engine 204 is configured to determine, based on the group-specific sub-hash value 229, a member index 230 that selects a member within the corresponding group. FIG. 4 is a block diagram of an index resolution engine 400 corresponds to the index resolution engine 204, according to an embodiment. Referring to FIGS. 2 and 4, the index resolution engine 400 includes a multiplier 402 configured to multiply the group-specific sub-hash value 229 by the number of members specified by the number of members indication 242 to generate a multiplied sub-hash value 404, in an embodiment. The index resolution engine 400 also includes a right-shift unit 406 configured to right-shift the multiplied sub-hash value 404 by the value of a First-Last+1, where First and Last are, respectively, the first bit index specified by the "First" bit indication in the sub-hash configuration information 240 and the last bit index specified by the "Last" bit indication in the sub-hash configuration information 204. The output of the right-shift unit 406 is the member index 230, in an embodiment. Referring back to FIG. 2, the summation engine 206 is configured to add the member table start index specified by the member table start index indication 244 to the member index 230 to generate a member table index 232 for selecting, from the member table 210, a member of the group corresponding to the group ID 225 associated with the packet, in an embodiment.

Figure 5:
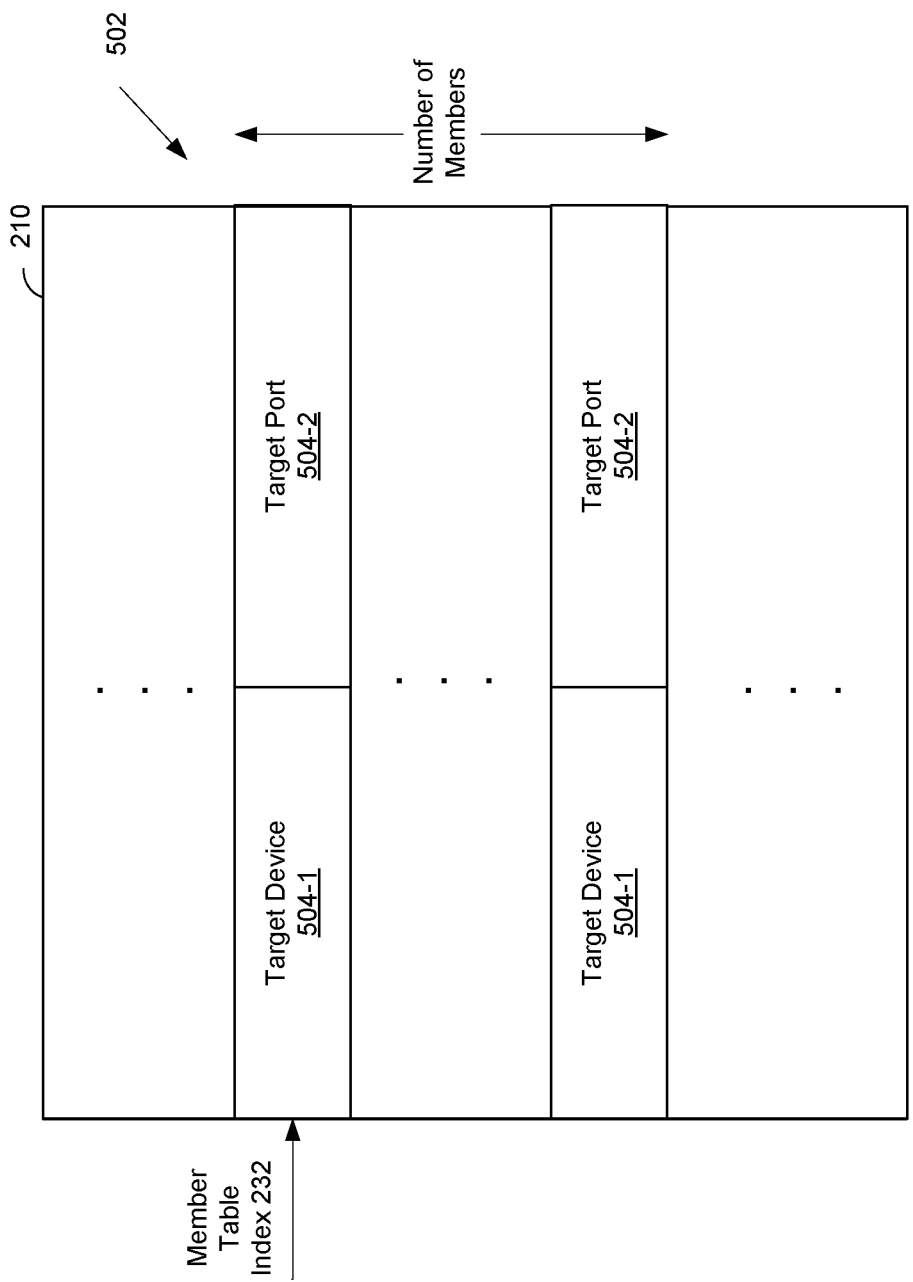
FIG. 5 is a block diagram of a member table utilized with the load balancer of FIG. 2, according to an embodiment.

The load balancer 200 is configured to access the member table 210 using the member table index 232, in an embodiment. Referring briefly to FIG. 5, the member table 210 includes a plurality of entries 502 indexed by respective member group indices 232, in an embodiment. The plurality of entries 502 includes respective sets of consecutive entries 502 corresponding to respective sets of entries 502 corresponding to respective groups supported by the network device 104. Each of the sets consecutive entries 502 includes a number of entries 502 corresponding to the number of members in the corresponding group. Each entry 502 includes i) a target device field 504-1 that specifies a target device to which a packet directed to the corresponding group is to be transmitted and ii) a target group member field 504-2 that specifies a group member to be selected for the packet, such as a port 108 or a path to be selected for transmission of the packet towards the target device, in an embodiment. The load balancer 200 is configured to retrieve, from the entry 502, of the member table 210, indexed by the member table index 232, an indication of a target device to which the packet is to be transmitted and an indication of a group member, such as a port 108 or a path to be selected for transmission of the packet towards the target device. The load balancer 200 is configured to associate the indication of the target device and the indication of the group member with the packet. For example, the load balancer 200 is configured to store the indication of the target device and the indication of the group member in the packet descriptor corresponding to the packet. The network device 104 is configured to transmit the packet, via the selected group member, towards the target device, in an embodiment.

Figure 6:
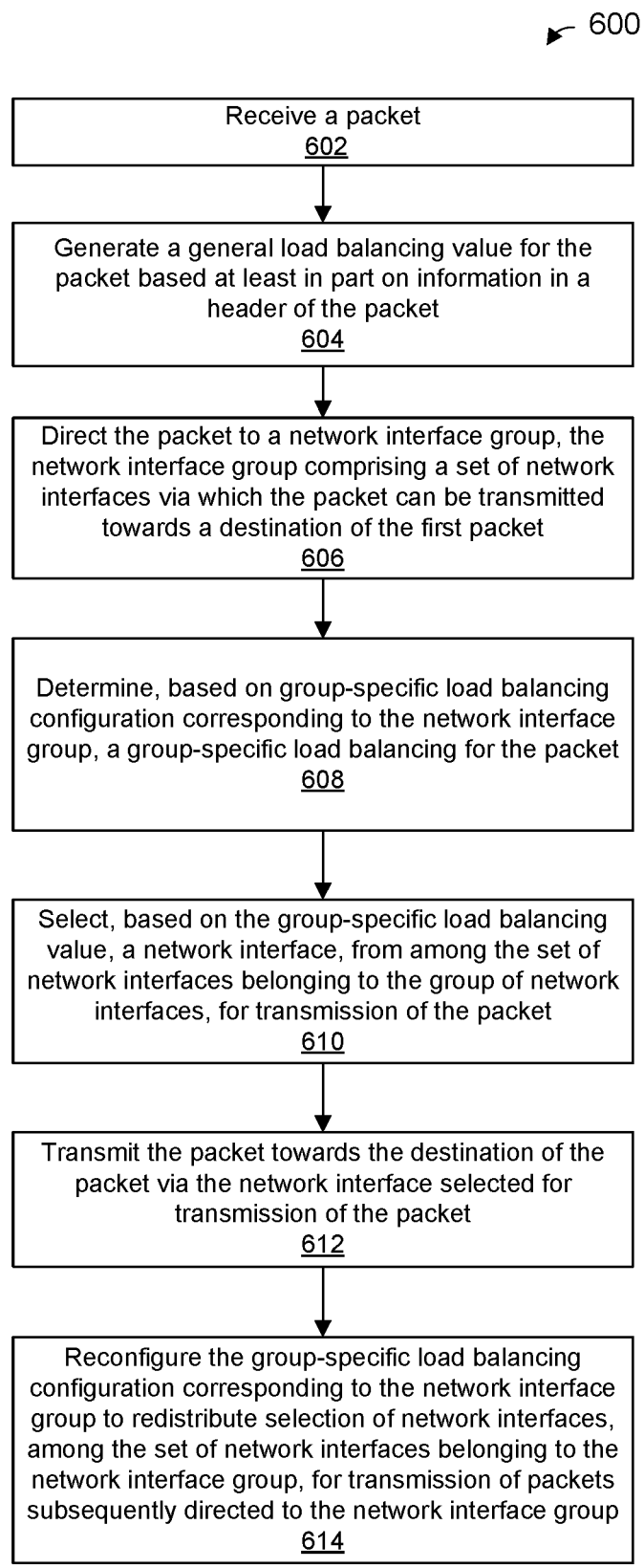
FIG. 6 is a flow diagram of an example method for load balancing in a network device, according to an embodiment.

FIG. 6 is a flow diagram of an example method 600 for load balancing in a network device, according to an embodiment. In an embodiment, the method 600 is implemented by the network device 104 of FIG. 1. For example, the load balancer 126 of the network device 104 of FIG. 1 is configured to at least partially implement the method 600, in an embodiment. For ease of explanation the method 600 is described in the context of the network device 104 of FIG. 1. However, the method 600 is implemented by a suitable device different from the network device 104 of FIG. 1. Similarly, the network device 104 of FIG. 1 is configured to utilize a suitable method different from the method 600 to implement load balancing, in some embodiments.

At block 602, the network device 104 receives a packet. At block 604, the network device 104 generates a general load balancing value for the packet. In an embodiment, the general load balancing value generator 122 generates the general load balancing value for the packet at block 604. In another embodiment, another suitable device generates the general load balancing value for the packet at block 604. In an embodiment, the general load balancing value is generated at block 604 based at least in part on information in a header of the packet. In an embodiment, the general load balancing value generated at block 604 is a general hash value generated by applying a hash function to a hash key generated for the packet to include a set of user-defined fields from a header of the packet and/or metadata associated with the packet. In another embodiment, the general load balancing value is generated at block 604 in other suitable manners.

At block 606, the network device 104 directs the packet to a network interface group for transmission of the packet. In an embodiment, the network interface group comprises a set of network interfaces via which the packet can be transmitted towards a destination of the packet. In an embodiment, the forwarding engine 124 of the network device 104 directs the packet to the network interface group by associating a group ID of the network interface group with the packet, such as by including the group ID of the network interface group in a packet descriptor corresponding to the packet.

At block 608, the network device 104 determines a group-specific load balancing value for the packet. In an embodiment, group-specific load balancing value generation engine 128 of FIG. 1 or the sub-hash derivation engine 202 of FIG. 2 determines the group-specific load balancing value at block 608 from the general load balancing value generated at block 604 for the packet. In another embodiment, another suitable device determines the group-specific load balancing value at block 608 from the general load balancing value generated at block 604 for the packet. In an embodiment, the group-specific load balancing value determined at block 608 is a sub-hash, or a modified sub-set (e.g., offset sub-hash) of the general hash value generated at block 604. In another embodiment, the group-specific load balancing value determined at block 608 is an identifier of a source ports via which the packet was received by the network device, a random or pseudorandom number generated for the packet, or any other suitable information that can be used in place of the general load balancing value generated for the packet at block 604. In an embodiment, the group-specific load balancing value for the packet is determined at block 608 based on group-specific load balancing configuration corresponding to the network interface group to which the packet is directed at block 606. For example, the group-specific load balancing value for the packet is derived at block 608 based on group-specific configuration information stored in the per group load balancing configuration memory 134 of FIG. 1 or the group configuration table 208 of FIG. 2 as described above, in an embodiment.

At block 610, the network device 104 selects a network interface, from among the set of network interfaces in the group to which the packet is directed at block 606, for transmission of the packet. The network device 104 selects the network interface based on the group-specific load balancing value generated at block 608. For example, the network device 104 determines, based on the group-specific load balancing value, a member index table into a member table, such as the member table 210 of FIG. 2 as described above, and selects the network interface by retrieving an indication of the network interface from the corresponding entry in the member index table. In other embodiments, the network interface is selected at block 610, based on the group-specific load balancing value generated at block 608, in other suitable manners.

At block 612, the network device 104 transmits the packet towards the destination of the packet via the network interface selected for transmission of the packet at block 610.

At block 614, the network device 104 reconfigures the group-specific load balancing configuration corresponding to the network interface group. In an embodiment, block 614 is performed during operation of the network device 104, subsequent to determining the group-specific load balancing value for the packet by the network device 104. In an embodiment, block 614 is performed based on monitoring traffic transmitted on network interfaces that are members of the network interface group, in response to detecting an unbalanced distribution of traffic among the network interfaces that are members of the network interface group as described above with reference to FIG. 1. In an embodiment, reconfiguring the group-specific load balancing configuration includes updating configuration information, stored in a memory, corresponding to the network interface group. In an embodiment, the network device 104 reconfigures the group-specific load balancing configuration to redistribute selection of network interfaces, among the set of network interfaces belonging to the network interface group, for transmission of packets subsequently directed to the network interface group.

In an embodiment, a method comprises: receiving a packet at a network device; generating, at the network device, a general load balancing value for the packet based at least in part on information in a header of the packet; directing, at the network device, the packet to a network interface group, the network interface group comprising a set of network interfaces via which the packet can be transmitted towards a destination of the packet; determining, at the network device based on group-specific load balancing configuration corresponding to the network interface group, a group-specific load balancing value for the packet; selecting, at the network device based on the group-specific load balancing value, a network interface, from among the set of network interfaces belonging to the network interface group, for transmission of the packet; transmitting the packet towards the destination of the packet via the network interface selected for transmission of the packet; and reconfiguring, at the network device, the group-specific load balancing configuration corresponding to the network interface group to redistribute selection of network interfaces, among the set of network interfaces belonging to the network interface group, for transmission of packets subsequently directed to the network interface group without redistributing selection of network interfaces among any other set of interfaces belonging to any other network interface group for transmission of packets subsequently directed to the other network interface group.

In other embodiments, the method further comprises any suitable combination of one or more of the following features.

The method further comprises monitoring load distribution among network interfaces belonging to the network interface group, and based on monitoring of the load distribution among network interfaces belonging to the network interface group, triggering reconfiguration of the group-specific load balancing configuration corresponding to the network interface group.

Determining the group-specific load balancing value comprises deriving the group-specific load balancing value from the general load balancing value based on configuration information stored in a memory.

Reconfiguring group-specific load balancing configuration corresponding to the network interface group comprises updating the configuration information stored in the memory.

Generating the general load balancing value for the packet comprises applying a hash function to the at least the information in the header of the packet to generate a general hash value.

Deriving the group-specific load balancing value includes selecting, from the general hash value, a subset of bits specified by the configuration information stored in the memory.

Reconfiguring group-specific load balancing configuration corresponding to the network interface group includes updating the configuration information stored in the memory to specify a new subset of bits to be selected from general hash values generated for subsequent packets.

Determining the group-specific load balancing value comprises replacing, based on the group-specific load balancing configuration corresponding to the network interface group, the general load balancing value with one of i) an indicator of a source port associated with the packet and ii) a pseudorandom number generated for the packet.

Generating the general load balancing value for the packet comprises generating the general load balancing value before determining the network interface group to which to direct the packet.

The packet is a first packet, the network interface group is a first network interface group, and the method further comprises determining, at the network device, a second group-specific load balancing value for a second packet received by the network device, the second packet directed to a second group of network interfaces different from the first group of network interfaces, including determining the second group-specific load balancing value based on group-specific load balancing configuration corresponding to the second network interface group different from the group-specific load balancing configuration corresponding to the first network interface group without redistributing selection of network interfaces among any other set of interfaces belonging to any other network interface group for transmission of packets subsequently directed to the other network interface group.

Generating the general load balancing value for the first packet comprises performing a hash function on the at least the information in the header of the first packet.

the method includes generating the second general load balancing value for the second packet by applying the hash function to the at least the information in the header of the second packet.

The method further comprises reconfiguring, at the network device, the group-specific load balancing configuration corresponding to the second network interface group to redistribute selection of network interfaces, among the set of network interfaces belonging to the second network interface group, for transmission of packets subsequently directed to the network interface group without modifying selection of network interfaces among the set of network interfaces belonging to the first network interface group.

In another embodiment, a network device comprises: a plurality of network interfaces; a packet processor coupled to the plurality of network interfaces, the packet processor including: a general load balancing value generator configured to generate, based at least in part on information in a header of the packet, a general load balancing value for a packet received via a network interface of the plurality of network interfaces, a forwarding engine configured to direct the packet to a network interface group for transmission of the packet, the network interface group comprising a set of network interfaces, of the plurality of network interfaces, via which the packet can be transmitted towards a destination of the packets, a group-specific load balancing value engine configured to determine, based on group-specific load balancing configuration corresponding to the network interface group, a group-specific load balancing value for the packet, and an egress interface selection engine configured to select, based on the group-specific load balancing value, a network interface, from among the set of network interfaces, for transmission of the packet; and a load balancing configuration engine configured to reconfigure group-specific load balancing configuration corresponding to the network interface group to redistribute selection of network interfaces for transmission of packets subsequently directed to the network interface group among the set of network interfaces belonging to the network interface group.

In other embodiments, the network device further comprises any suitable combination of one or more of the following features.

The network device further comprises a network interface monitor unit configured to monitor load distribution among network interfaces belonging to the network interface group, and, based on monitoring of the load distribution among network interfaces belonging to the network interface group, trigger the load balancing configuration engine to reconfigure the group-specific load balancing configuration corresponding to the network interface group.

The group-specific load balancing value engine is configured to derive the group-specific load balancing value from the general load balancing value based on configuration information stored in a memory.

The load balancing configuration engine is configured to reconfigure the group-specific load balancing configuration corresponding to the network interface group at least by updating the configuration information stored in the memory.

The general load balancing value generator is configured to generate the general load balancing value for the packet at least by applying a hash function to the at least the information in the header of the packet.

The group-specific load balancing value engine is configured to derive the group-specific load balancing value at least by selecting, from the general hash value, a subset of bits specified by the configuration information stored in the memory.

The load balancing configuration engine is configured to reconfigure the group-specific load balancing configuration corresponding to the network interface group at least by updating the configuration information stored in the memory to specify a new subset of bits to be selected from general hash values generated for subsequent packets.

The general load balancing value generator is configured to determine the group-specific load balancing value at least by replacing, based on the group-specific load balancing configuration corresponding to the network interface group, the general load balancing value with one of i) an indicator of a source port associated with the packet and ii) a pseudorandom number generated for the packet.

The general load balancing value generator is configured to generate the general load balancing value for the packet before the forwarding engine determines the network interface group to which to direct the packet.

The packet is a first packet, the network interface group is a first network interface group, and the group-specific load balancing value engine is configured to determine a second group-specific load balancing value for a second packet received by the network device, the second packet directed to a second group of network interfaces different from the first group of network interfaces, including determining the second group-specific load balancing value based on group-specific load balancing configuration corresponding to the second network interface group different from the group-specific load balancing configuration corresponding to the first network interface group without redistributing selection of network interfaces among any other set of interfaces belonging to any other network interface group for transmission of packets subsequently directed to the other network interface group.

The general load balancing value generator is configured to generate the first general load balancing value for the first packet comprises performing a hash function on the at least the information in the header of the first packet, and generate the second general load balancing value for the second packet by applying the hash function to the at least the information in the header of the second packet.

The load balancing configuration engine is further configured to reconfigure the group-specific load balancing configuration corresponding to the second network interface group to redistribute selection of network interfaces, among the set of network interfaces belonging to the second network interface group, for transmission of packets subsequently directed to the network interface group without modifying selection of network interfaces among the set of network interfaces belonging to the first network interface group.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
receiving a packet at a network device;
generating, at the network device, a general load balancing value for the packet based at least in part on information in a header of the packet;
directing, at the network device, the packet to a network interface group, the network interface group comprising a subset of network interfaces via which the packet can be transmitted towards a destination of the packet, the subset of network interfaces not including all network interfaces of the network device;
determining, at the network device based on group-specific load balancing configuration information associated with the network interface group, a group-specific load balancing value for the packet, the group-specific load balancing configuration information specifying how to alter general load balancing values for determining group-specific load balancing values for packets directed to the network interface group;
selecting, at the network device based on the group-specific load balancing value, a network interface, from among the subset of network interfaces belonging to the network interface group, for transmission of the packet from the network device;
transmitting the packet towards the destination of the packet via the network interface selected for transmission of the packet; and
reconfiguring, at the network device, the group-specific load balancing configuration information associated with the network interface group, for determining group-specific balancing values for subsequent packets directed to the network interface group, to change how general load balancing values, generated based at least in part on information in headers of the subsequent packets, are altered, to redistribute selection of network interfaces, among the set subset of network interfaces belonging to the network interface group, for transmission of the subsequent packets from the network device.

2. The method of claim 1, further comprising
monitoring load distribution among the subset of network interfaces belonging to the network interface group, and
based on monitoring of the load distribution among the subset of network interfaces belonging to the network interface group, triggering reconfiguration of the group-specific load balancing configuration information associated with the network interface group.

3. The method of claim 1, wherein
the group-specific load balancing configuration information is stored in a memory,
determining the group-specific load balancing value comprises deriving the group-specific load balancing value from the general load balancing value based on the group-specific load balancing configuration information stored in the memory, and
reconfiguring the group-specific load balancing configuration information comprises updating the group-specific load balancing configuration information stored in the memory.

4. The method of claim 3, wherein
generating the general load balancing value for the packet comprises applying a hash function to the at least the information in the header of the packet to generate a general hash value, and
deriving the group-specific load balancing value includes selecting, from the general hash value, a subset of bits specified by the group-specific load balancing configuration information stored in the memory.

5. The method of claim 4, wherein reconfiguring group-specific load balancing configuration information associated with the network interface group includes updating the group-specific load balancing configuration information stored in the memory to specify a new subset of bits to be selected from general hash values generated for the subsequent packets directed to the network interface group.

6. The method of claim 1, wherein determining the group-specific load balancing value comprises replacing, based on the group-specific load balancing configuration information associated with the network interface group, the general load balancing value with one of i) an indicator of a source port associated with the packet and ii) a pseudo-random number generated for the packet.

7. The method of claim 1, wherein generating the general load balancing value for the packet comprises generating the general load balancing value before determining the network interface group to which to direct the packet.

8. The method of claim 1, wherein
the packet is a first packet,
the first general load balancing value generated for the first packet is a first load balancing value,
the network interface group is a first network interface group,
the subset of network interfaces belonging to the first network interface group is a first subset of network interfaces of the network device, and
the method further comprises
generating, at the network device, a second general load balancing value for a second packet received by the network device, the second general load balancing value being generated based at least in part on information in a header of the second packet,
directing, at the network device, the second packet to a second network interface group, the second network interface group comprising a second subset of network interfaces via which the second packet can be transmitted towards a destination of the second packet, the second subset of network interfaces being different from the first subset of network interfaces,
determining, at the network device based on i) the second general load balancing value generated for the second packet and ii) group-specific load balancing configuration information associated with the second network interface group different from the group-specific load balancing configuration information associated with the first network interface group, the group specific load balancing configuration information associated with the second network interface group specifying how to alter general load balancing values for determining group-specific load balancing values for packets directed to the second network interface group.

9. The method of claim 8, wherein
generating the first general load balancing value for the first packet comprises applying a hash function to the at least the information in the header of the first packet, and
generating the second general load balancing value for the second packet comprises applying the hash function to the at least the information in the header of the second packet.

10. The method of claim 8, further comprising reconfiguring, at the network device, the group-specific load balancing configuration information associated with the second network interface group to redistribute selection of network interfaces, among the second subset of network interfaces belonging to the second network interface group, for transmission of packets subsequently directed to the second network interface group without modifying selection of network interfaces among the first subset of network interfaces belonging to the first network interface group.

11. A network device, comprising:
a plurality of network interfaces;
a packet processor coupled to the plurality of network interfaces, the packet processor including:
a general load balancing value generator configured to generate, based at least in part on information in a header of the packet, a general load balancing value for a packet received via a network interface of the plurality of network interfaces,
a forwarding engine configured to direct the packet to a network interface group for transmission of the packet, the network interface group comprising a subset of network interfaces, of the plurality of network interfaces, via which the packet can be transmitted towards a destination of the packets, the subset not including all of the plurality of network interfaces of the network device,
a group-specific load balancing value engine configured to determine, based on group-specific load balancing configuration information associated with the network interface group, a group-specific load balancing value for the packet, the group-specific load balancing configuration information specifying how to alter general load balancing values for determining group-specific load balancing values for packets directed to the network interface group, and
an egress interface selection engine configured to select, based on the group-specific load balancing value, a network interface, from among the subset of network interfaces belonging to the network interface group, for transmission of the packet; and
a load balancing configuration engine configured to reconfigure the group-specific load balancing configuration information associated with the network interface group, for determining group-specific balancing values for subsequent packets directed to the network interface group, to change how general load balancing values, generated based at least in part on information in headers of the subsequent packets are altered, to redistribute selection of network interfaces, among the subset of network interfaces belonging to the network interface group, for transmission of the subsequent packets from the network device.

12. The network device of claim 11, further comprising a network interface monitor unit configured to
monitor load distribution among network interfaces belonging to the network interface group, and
based on monitoring of the load distribution among network interfaces belonging to the network interface group, trigger the load balancing configuration engine to reconfigure the group-specific load balancing configuration information associated with the network interface group.

13. The network device of claim 11, wherein
the group-specific load balancing configuration information is stored in a memory,
the group-specific load balancing value engine is configured to derive the group-specific load balancing value from the general load balancing value based on the group-specific load balancing configuration information stored in the memory, and
the load balancing configuration engine is configured to reconfigure the group-specific load balancing configuration information associated with the network interface group at least by updating the group-specific load balancing configuration information in the memory.

14. The network device of claim 13, wherein
the general load balancing value generator is configured to generate the general load balancing value for the packet at least by generating a general hash value by applying a hash function to the at least the information in the header of the packet, and
the group-specific load balancing value engine is configured to derive the group-specific load balancing value at least by selecting, from the general hash value, a subset of bits specified by the group-specific configuration information stored in the memory.

15. The network device of claim 14, wherein the load balancing configuration engine is configured to reconfigure the group-specific load balancing configuration information associated with the network interface group at least by updating the group specific load balancing configuration information stored in the memory to specify a new subset of bits to be selected from general hash values generated for subsequent packets.

16. The network device of claim 13, wherein the general load balancing value generator is configured to determine the group-specific load balancing value at least by replacing, based on the group-specific load balancing configuration information associated with the network interface group, the general load balancing value with one of i) an indicator of a source port associated with the packet and ii) a pseudo-random number generated for the packet.

17. The network device of claim 11, wherein the general load balancing value generator is configured to generate the general load balancing value for the packet before the forwarding engine determines the network interface group to which to direct the packet.

18. The network device of claim 11, wherein
the packet is a first packet,
the network interface group is a first network interface group,
the subset of network interfaces belonging to the first network interface group is a first subset of network interfaces of the network device,
the general load balancing value generator is further configured to generate a second general load balancing value for a second packet received by the network device, the second general load balancing value being generated based at least in part on information in a header of the second packet,
the forwarding engine is further configured to the second packet to a second network interface group, the second network interface group comprising a second subset of network interfaces via which the second packet can be transmitted towards a destination of the second packet, the second subset of network interfaces being different from the first subset of network interfaces, and
the group-specific load balancing value engine is further configured to determine based on i) the second general load balancing value generated for the second packet and ii) group-specific load balancing configuration information associated with the second network interface group different from the group-specific load balancing configuration information associated with the first network interface group, the group specific load balancing configuration information associated with the second network interface group specifying how to alter general load balancing values for determining group-specific load balancing values for packets directed to the second network interface group.

19. The network device of claim 18, wherein the general load balancing value generator is configured to
generate the first general load balancing value for the first packet at least by applying a hash function to the at least the information in the header of the first packet, and
generate the second general load balancing value for the second packet at least by applying the hash function to the at least the information in the header of the second packet.

20. The network device of claim 18, wherein the load balancing configuration engine is further configured to reconfigure the group-specific load balancing configuration information associated with the second network interface group to redistribute selection of network interfaces, among the second subset of network interfaces belonging to the second network interface group, for transmission of packets subsequently directed to the second network interface group without modifying selection of network interfaces among the first subset of network interfaces belonging to the first network interface group.

* * * * *